United States Patent
Tölli et al.

(10) Patent No.: US 8,620,340 B2
(45) Date of Patent: Dec. 31, 2013

(54) INTERFERENCE AVOIDANCE IN MOBILE COMMUNICATION NETWORK EMPLOYING DISTRIBUTED ANTENNA SYSTEM

(75) Inventors: Antti Tölli, Oulu (FI); Petri Komulainen, Oulu (FI); Juha Karjalainen, Oulu (FI); Harri Pennanen, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/257,160

(22) PCT Filed: Mar. 19, 2009

(86) PCT No.: PCT/EP2009/053239
§ 371 (c)(1),
(2), (4) Date: Jan. 18, 2012

(87) PCT Pub. No.: WO2010/105683
PCT Pub. Date: Sep. 23, 2010

(65) Prior Publication Data
US 2012/0115497 A1      May 10, 2012

(51) Int. Cl.
*H04W 72/00* (2009.01)
(52) U.S. Cl.
USPC ........................................... 455/452.2
(58) Field of Classification Search
USPC ............ 455/11.1, 562.1, 452.2, 456.1, 414.1, 455/450, 69, 63.1, 452.1; 370/329, 310, 370/280, 252, 342, 335, 479; 375/316, 260
See application file for complete search history.

(56) References Cited

U.S. PATENT DOCUMENTS

| | | | |
|---|---|---|---|
| 8,094,571 B2* | 1/2012 | Gaal et al. | 370/252 |
| 2007/0191067 A1* | 8/2007 | Nguyen et al. | 455/562.1 |
| 2008/0318613 A1 | 12/2008 | Balachandran et al. | 455/522 |
| 2010/0309998 A1* | 12/2010 | Jung et al. | 375/260 |

FOREIGN PATENT DOCUMENTS

WO      WO 2005/122619 A1      12/2005

OTHER PUBLICATIONS

R1-082501, 3GPP TSG RAN WG1 Meeting #53bis, "Collaborative MIMO for LTE-A Downlink", Warsaw, Poland, Jun. 30-Jul. 4, 2008, Alcatel Shanghai Bell, Alcatel Lucent, 7 pgs.

* cited by examiner

*Primary Examiner* — Kiet Doan
(74) *Attorney, Agent, or Firm* — Harrington & Smith (57) ABSTRACT

There is provided a solution for improving the efficiency of a mobile communication network applying a distributed antenna system. The solution includes avoiding inter-cell interference with only a limited amount of backhaul information exchange between the base stations of the distributed antenna system, and applying beamforming techniques according to determined user allocation.

22 Claims, 4 Drawing Sheets

INTERFERENCE AVOIDANCE IN MOBILE COMMUNICATION NETWORK EMPLOYING DISTRIBUTED ANTENNA SYSTEM

FIELD

The invention relates generally to mobile communication networks. More particularly, the invention relates to interference avoidance in a mobile communication network employing a distributed antenna system.

BACKGROUND

Figure 1:
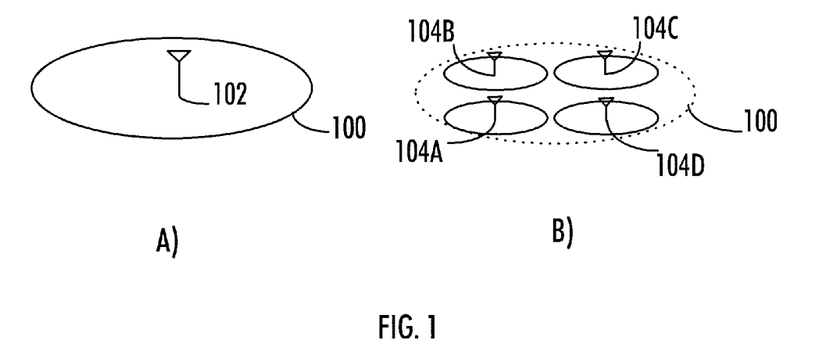
FIG. 1 presents a communication network according to an embodiment.

In radio communication networks, such as the Long Term Evolution (LTE) or the LTE-Advanced (LTE-A) of the $3^{rd}$ Generation Partnership Project (3GPP), network planning may comprise the use of a distributed antenna system (DAS) also known as a co-operative antenna system. A proposal have been made to cover environments of otherwise insufficient radio coverage with the DAS, where instead of covering an area 100 by only one base station 102 (or Node B (NB) as specified in the LTE) as depicted in FIG. 1A, the same coverage 100 is provided by multiple base stations 104A to 104D as illustrated in FIG. 1B.

The base stations of the DAS co-operate with each other via a backhaul link such as a transport medium or an X2 interface as in the specifications of the LTE. The control of the co-operation between the base stations 104A-104D in FIG. 1B may be performed by a controller, although not shown in the Figure. The controller may be located separately from the base stations or integrated within one of the base stations.

However, there are challenges related to a configuration of the DAS, such as how to keep the interference between the cells covered by the base stations as small as possible. In order to enable interference-free communication between user terminals and the base stations of the DAS, the controller or each of the base stations need a complete channel knowledge of each of the links between the user terminals and the base stations. Without such information, the interference may become a significant bottleneck for the efficiency of a mobile radio communication employing the DAS. However, the exchange of full channel information requires intensive backhaul usage in the network. Thus, it is important to provide a solution for efficiently minimizing inter-cell interference without the intensive backhaul usage.

BRIEF DESCRIPTION OF THE INVENTION

An object of the invention is to avoid inter-cell interference in a distributed antenna system.

According to an aspect of the invention, there are provided methods as specified in claims 1 and 14.

According to an aspect of the invention, there are provided apparatuses as specified in claims 7, 13, 17 and 20.

According to an aspect of the invention, there are provided computer program products as specified in claims 21 and 22.

Embodiments of the invention are defined in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Although this invention is described using the LTE [or Evolved universal mobile telecommunications system (UMTS) terrestrial radio access network (UTRAN)] as a basis, it could be applicable to any other wireless mobile communication systems as well. For example, the embodiments may be applied to the UMTS or the Global system for mobile communications (GSM), etc. The telecommunication system may have a fixed infrastructure providing wireless services to subscriber terminals.

Figure 2:
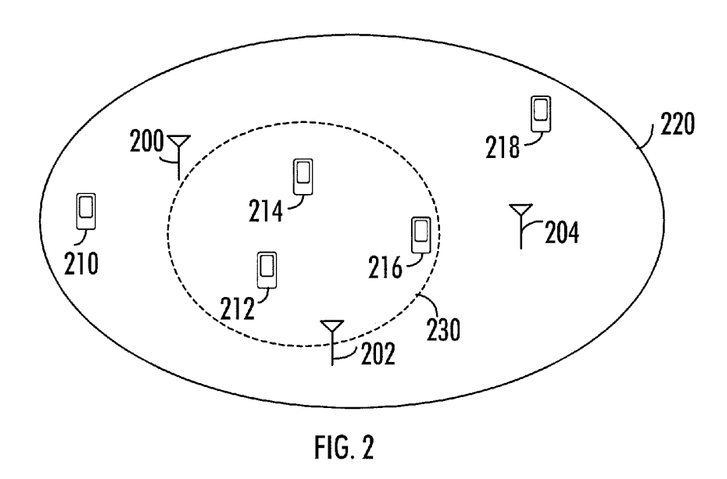
FIG. 2 presents a communication network according to an embodiment.

FIG. 2 illustrates a mobile communication network according to an embodiment. The network comprises a plurality of Node Bs (NB) 200 to 206 and a plurality of user terminals (UT) 210 to 218. The NB 200 to 206 may alternatively be an evolved node B (eNB) as in the LTE, a radio network controller (RNC), or any other apparatus capable of controlling a radio communication. The user terminal 210 to 218 may be a palm computer, user equipment or any other apparatus capable of operating in a mobile communication network. In general the UTs 210 to 218 may be served by any of the NBs 200 to 204. In practice, the propagation loss between an NB and a UT limits the situation such that only certain NBs can communicate with a certain UT. According to an embodiment, the NBs 200 to 204 form a distributed antenna system (DAS), also known as co-operative antenna system or coordinated multi-point transmission system, which facilitates multi-user precoding techniques across the distributed NBs 200 to 204. Each base station generates an own cell that it applies in communication purposes.

According to an embodiment, the NBs 200 to 204 are assumed to be equipped with one or more antenna elements that can be used in transmitting and/or receiving information from the air interface. In case of multiple antenna elements, the elements can be used to utilize radio resources (space, frequency, time) more efficiently by exploiting the available spatial degrees of freedom in the transmission/reception channel. The UTs 210 to 218 may or may not be equipped with multiple antennas.

In a coherent multi-user DAS scenario for avoiding interference, extensive signaling is needed between the NBs since each of the NBs needs to be aware of the complete channel knowledge between the NBs and the UTs in the joint-processing region. The complete channel knowledge denotes information representing how the amplitude and the phase of the transmitted signal vary in the transmission/reception channel. In other words, the information is complex. Further, when the complete channel knowledge, or full channel state information (CSI), is transmitted, the information is a vector for each user terminal instead.

Further, tight synchronization is needed between the NBs since the same carrier signal is applied between different NBs.

Another type of a multi-user DAS scenario is performed in a non-coherent way. According to an embodiment of the invention, the non-coherent multi-user DAS scenario is a less restrictive regarding the signaling between the NBs, since each NB transmits data by using its own carrier. Thus, synchronization may not be needed. However, in order to obtain inter-cell interference-free communication, full channel knowledge is again needed regarding the UTs in the joint-processing region. The communication of the full channel knowledge between the NBs (or from the NBs to the controller) is required in order to perform efficient inter-cell interference avoidance with beamforming precoding techniques at each NB. Consequently, the communication requires intensive backhaul usage and, therefore, limits the use of radio resources for other purposes.

FIG. 2 further shows a region 230, which may be called a joint-processing region, or a cell-edge region, since the UTs 212 to 216 in the joint-processing region 230 may be served from a plurality of NBs. The UTs 210 and 218 may, in general, be served with only the NB that is relatively close to the UT, that is NBs 200 and 204, respectively. Now, without a proper user allocation, the plurality of NBs may cause inter-cell interference between the NBs transmitting data and the UTs located in the joint-processing region 230. The inter-cell interference may be minimized or even avoided by applying a proper user allocation with limited feedback signaling according to an embodiment.

The DAS of FIG. 2 provides radio coverage to the area 220. The NBs 200 to 204 may be controlled by a controller that is connected to each of the NBs 200 to 204, although not shown in the Figure. The controller may be located separately from the NBs 200 to 204 or it may be integrated within one NB 200 to 204. That is, one of the NBs 200 to 204 may be responsible for controlling the co-operation between the NBs 200 to 204. Let us denote this NB as a master NB and the other NBs of the DAS as slave NBs.

Figure 3:
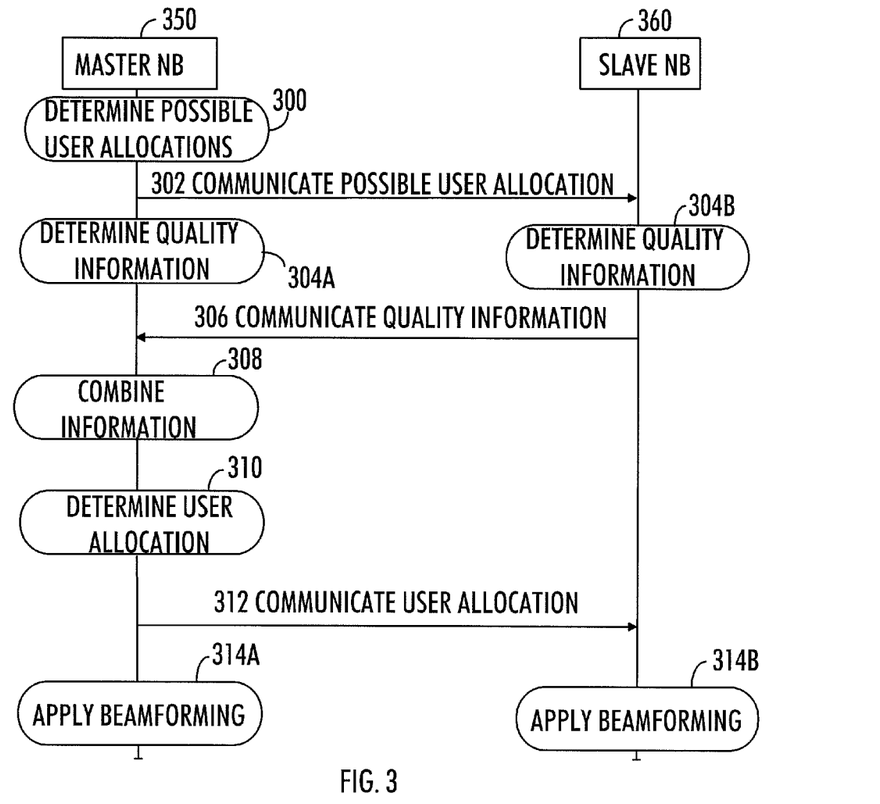
FIG. 3 shows a signaling diagram for improving efficiency in a distributed antenna system according to an embodiment.

FIG. 3 illustrates a solution for avoiding the inter-cell interference of the DAS according to an embodiment. The master NB 350 determines in step 300 user allocation options comprising possible serving base stations for each user terminal within the distributed antenna system. In other words, the master NB 350 may generate a table of possible beam/null allocation options for the UTs within the distributed antenna system. Each user allocation option comprises a list of UTs to be served and a corresponding list of their possible serving NBs. For example, possible user allocation options in the system shown in FIG. 2 with regard to NB 204 comprise options where the NB 204 serves only the UT 216, only the UT 218, both of the UTs 216, 218 or none of the UTs 216, 218, assuming that the NB 204 has such transmitting properties that the other UTs are located too far from the NB 204. In order to determine the user allocation options, the NBs within the DAS may have had prior communication with each other and, thus, be aware of the locations of each UT within the DAS.

An NB of the DAS may be able to measure at least the channel of each UT. According to an embodiment, the master NB 350 performs the measuring, for example, during an uplink transmission in a time division duplex (TDD) frame. The master NB 350 is able to measure the channel of each UT regardless of which NB the UT is communicating with. That is regardless of which NB the UT is identified with. The measuring of the channel may comprise measuring the signal strength, the full channel knowledge, etc. The slave NB is also able to perform the measuring of the channel of each UT within the DAS.

Further, in step 302, the master NB 350 communicates to each NB of the DAS at least one user allocation option comprising information representing the at least one UT that is possibly served by the corresponding NB. The master NB 350 further transmits indexes identified with different allocation options. This way the indexes may be used in further signaling between the NBs 350, 360. The communication may take place via an X2 interface as in LTE or via other transport media such as an optical fiber.

Accordingly, both of the master NB 350 and the slave NB 360 obtain knowledge of at least one user allocation option regarding the corresponding NB. In other words, both the master NB 350 and the slave NB 360 may obtain knowledge of the user allocation options either by determining the user allocation options (as in the master NB 350), or by receiving at least one user allocation option (as in the slave NB 360).

Then, the NBs 350 and 360 determine, in step 304A and 304B, for each user allocation option regarding the NB 350, 360 coefficients for applying beamforming. That is, the NB 350 determines the coefficients for each user allocation option regarding the NB 350, whereas the NB 360 may determine the coefficients for each user allocation option regarding the NB 360. In other words, the NB 350, 360 after obtaining the knowledge of possible user allocation options may determine the precoding coefficients or precoding weights that are applied with the plurality of antennas in the NBs 350 and 360 in order to form transmission beams in one direction and nulls in another direction. The number of beams and nulls may be one or more. That is, an NB may generate, for example, two beams towards two users while generating nulls to other users. The coefficients may also be applied in determining quality information as will be described next.

Further, in step 304A and 304B, the master NB 350 and the slave NB 360 may determine the quality information related to at least one user allocation option regarding the corresponding NB 350, 360. According to an embodiment, the quality information is related to at least one of the following: each possible user allocation option related to the NB 350, 360, and a communication link for each user terminal that is possibly served by the NB 350, 360. In the latter case, the NB 350, 360 determines quality information only for each communication link between the UTs that are marked as served UTs by the NB 350, 360 according to the user allocation option. In the former case, the NB 350, 360 determines quality information for each user allocation option that involves the NB 350, 360.

Let us take a look at an example, in which possible user allocation options in the system shown in FIG. 2, with regard to NB 204, comprises user allocation options where the NB 204 serves only the UT 216, only the UT 218, both of the UTs 216, 218 or none of the UTs 216, 218. In this case, the example would in lead in determining only two quality information values when the quality information relates to a communication link for each user terminal 216, 218 that is possibly served by the NB 204. That is, only two UTs 216, 218 are involved in the user allocation options for NB 204. In the same example, when the quality information relates to each possible user allocation related to the NB 204, the quality information would comprise three values: one for an allocation where the NB 204 serves only the UT 216, one for an allocation where the NB 204 serves only the UT 218, and one for an allocation where the NB 204 serves both of the UTs 216 and 218.

Further, according to an embodiment, the quality information may comprise a combined rate for each user allocation option regarding the NB 350, 360 that determines the quality information. The combined rate corresponds to all communication links between the NB 350, 360 and the user terminals in one user allocation option. The combined rate may be, for example, a sum rate of each of the communication links between the NB 350, 360 and the user terminals in one user allocation option. Further, the combined rate may be any other arithmetic combination of the rates in different communication links. Consequently, the quality information may, in this case, comprise one value for each user allocation option involving the corresponding NB. The rate may correspond to a transmission rate and, therefore, the capacity to transfer data between the NB 350, 360 and a user terminal.

According to another embodiment, the quality information may comprise a channel gain for a communication link between the NB 350, 360 and each of the user terminals that are possibly served by the NB 350, 360. The effective channel gain denotes how much the communication channel affects the magnitude/power of the transmitted signal. The effective channel gain takes into account the beamforming. In other words, the NB 350, 360 may determine the resulting beamforming gain for each UT that is marked as served by the corresponding NB 350, 360. Consequently, the quality information, in this case, comprises one value for each user terminal that is served by the NB 350, 360 according to the user allocation options. According to an embodiment, the value is scalar and real.

Figure 4:
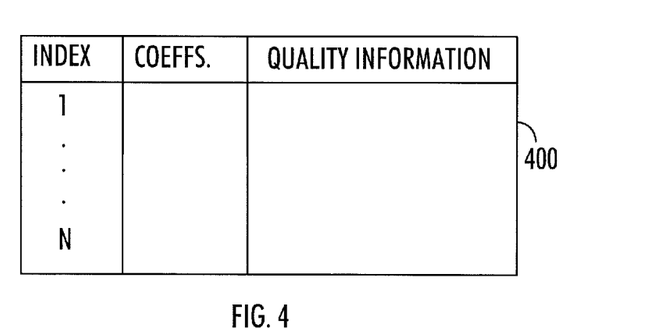
FIG. 4 illustrates a possible information table according to an embodiment.

FIG. 4 illustrates a possible information table 400 updated by an NB 350, 360 while determining the quality information and the coefficients. As explained, the user allocation options may be identified with an index. The indexes may be from 1 to N, corresponding to each of the N possible user allocations. The NB 350, 360 determining the coefficients and the quality information may update the table when, for example, determining the coefficients for precoding related to beamforming that would fulfill the user allocation option of index 1 and by determining the quality information for that user allocation option. The user allocation of index 1 may represent the case where, regarding FIG. 2, the NB 204 serves only the UT 216, the user allocation of index 2 may represent the case where the NB 204 serves only the UT 218, and the user allocation of index 3 (=N in this example) may represent the case where the NB 204 serves both of the UTs 216 and 218.

According to an embodiment, the master NB 350 selects a set of user terminals from the user terminals that can be served by a slave NB 360 according to the user allocation options. In this example, the master NB 350 would send only the indexes of the set of user terminals to the slave NB 360, not the indexes of all the user terminals involved with the slave NB 360 according to the user allocation options. The quality information is then determined only for the selected set of users or for the user allocations thereof, which ever is desired. This way the computational complexity may be decreased since not all of the UTs that may possibly be served by the slave NB 360 according to the user allocation options need to be considered.

According to an embodiment, the set of user terminals is selected such that they offer the strongest communication links to the slave NB 360. The strongest communication links can be determined on the basis of the communication link between the NB 360 and each of the user terminals, for example. Alternatively, the set of user terminals is selected, according to another embodiment, such that the spatially most compatible UTs are selected. In other words, the UTs located in different directions from the slave NB 360 are selected.

Further, according to another embodiment, the master NB 350 may select a set of user allocation options that are applied when calculating the quality information. That is, instead of selecting a set of user terminals, a set of user allocation options is selected. The set of user allocation options may be selected such that they offer the maximum combined rate, the strongest communication links, or the like.

Then the NB 360 may, in step 306, communicate the quality information back to the transmitter of the at least one user allocation option. That is, in this case to the master NB 350. Instead of transmitting the full channel state information (CSI) between the NBs of the DAS, the slave NB 360 transmits, in step 306, only the quality information that is represented in at least one real value, such as the combined rate for each user allocation option, or the effective channel gain for a communication link to each UT that may be served by the NB 360. In other words, the information is not complex information containing imaginary values. Further, the information is scalar for each user allocation option, or for each communication link to each UT that may be served by the NB 360.

After the master NB 350 has received quality information from the NBs of the distributed antenna system, the master NB 350 combines the plurality of available quality information in step 308. In other words, the master NB 350 may combine the quality information received from other NBs. Further, the master NB 350 may combine the received quality information with its own determined quality information. The combination may represent one real value for each possible user allocation option, or it may represent multiple values for each possible user allocation option.

Then, in step 310, the master NB 350 determines an optimal user allocation on the basis of the quality information. The quality information may, at this point, be the combined quality information comprising information received from the slave NBs 360 and information determined by the master NB 350. Thus, each of the NBs 350 and 360 participate in determining the optimal user allocation.

More specifically, the master NB 350 determines the optimal user allocation for each base station of the distributed antenna system on the basis of the combined quality information. According to an embodiment, the optimal user allocation may be determined such that it results in the maximum combined rate across the distributed antenna system (the collaborating NBs). That is, the master NB 350 may determine the optimal user allocation such that the quality information representing the combined transmission rates of each NB of the DAS is maximized. For example, the master NB 350 may sum the combined rates available from each of the NBs of the DAS and for a certain user allocation, and after performing this for each of the user allocation options, it may determine that the user allocation that results in the maximum summed rate is the optimal user allocation.

In step 312, the master NB 350 communicates to each NB of the distributed antenna system the optimal user allocation regarding the corresponding NB. The master NB 350 may transmit only the index of the optimal user allocation, and the slave NB 360 applies this index to select the user allocation from the user allocation options. According to an embodiment, the communicated optimal user allocation also includes information regarding the user terminals towards which the slave NB 360 is supposed to form nulls.

Finally in steps 314A and 314B, the NBs 350 and 360 apply beamforming towards a selected, NB-specific set of user terminals on the basis of the optimal user allocation. The optimal user allocation is determined, as described, according to the available quality information. The NB 350, 360, after knowing the optimal user allocation, may use the received index of the optimal user allocation and select the coefficients for performing beamforming from the table of FIG. 4, or the like. The NB, or a base station, specific set of user terminals means that each NB is allocated to serve a certain set of user terminals. Another NB may serve another set of UTs. The sets may comprise partly the same UTs or UTs in one set are not included in another set of UTs.

According to an embodiment, as the NB 350, 360 performs beamforming to some of the UTs, it generates nulls towards the users not belonging to the selected, NB-specific set of user terminals. The idea of forming nulls towards some users in known as zero-forcing. When zero forcing is applied, it may be sufficient to determine quality information for only the communication links between the UTs that are marked as possibly served UTs from the NB according to the user allocation options. In this case the quality information comprises the effective channel gains of the links to the UTs.

Figure 5:
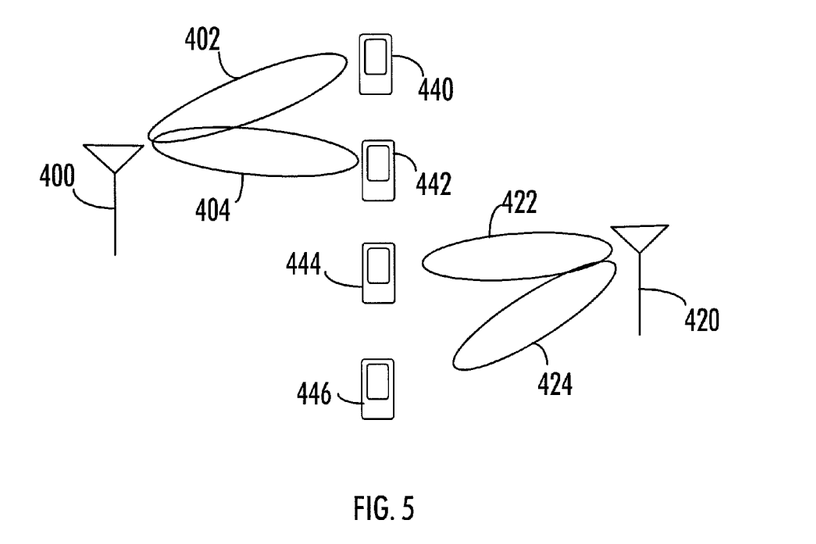
FIG. 5 illustrates beamforming according to an embodiment.

The beamforming according to an embodiment is shown in FIG. 5, where two NBs 400 and 420 forming a distributed antenna system apply beamforming as a result of the user allocation as described related to FIG. 3. Consequently, the optimal user allocation has been determined based on the quality information determined and communicated between the at least two NBs of the DAS. The optimal user allocation shows that, for example, the maximum sum rate across the DAS is obtained when in the user allocation the NB 400 provides radio coverage to users 440 and 442, and the NB 420 provides radio coverage to UTs 444 and 446. Therefore, the NB 400 may apply such precoding weights that it generates transmit/receive beams 402 and 404 towards the users 440 and 442, respectively, and nulls to the users 444 and 446. The NB 420, on the other hand, may generate beams 422 and 424 towards users 444 and 446, respectively, and nulls towards UTs 440 and 442. This way the inter-cell interference may be limited to a small amount or even totally avoided in the DAS. According to an embodiment, the beams 402, 404, 422 and 424 are transmitted simultaneously, and they carry different data.

The number of possible served UTs is limited to the number of antenna elements in a NB. That is, if the NB has M antennas, then it can simultaneously generate beams or nulls towards a maximum of M UTs. That is, in total M streams and nulls can be formed from the single NB having M antenna elements.

According to another embodiment, the NB 350, 360 may generate a controlled amount of interference towards the users not belonging to the selected, NB-specific set of user terminals, instead of generating nulls towards those users. The controlled amount of interference may be determined such that the overall performance is improved in comparison with the case where nulls are generated towards the users. The metric for improving the performance may be, for example, the combined rate of the user allocation option. Therefore, some controlled inter-cell interference may be allowed in order to further improve the performance of the system.

Figure 6:
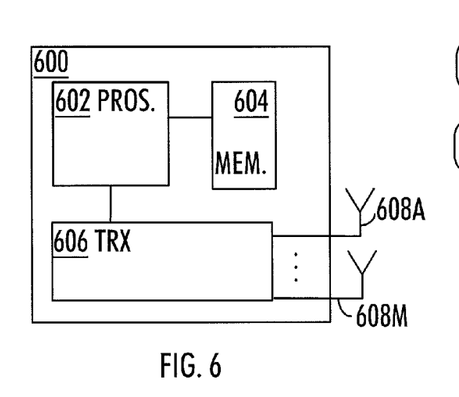
FIG. 6 shows a block diagram of an apparatus according to an embodiment.

A very general architecture of an apparatus according to an embodiment of the invention is shown in FIG. 6. FIG. 6 shows only the elements and functional entities required for understanding the apparatus 600 according to an embodiment of the invention. Other components have been omitted for reasons of simplicity. The implementation of the elements and functional entities may vary from that shown in FIG. 6. The connections shown in FIG. 6 are logical connections, and the actual physical connections may be different. It is apparent to a person skilled in the art that the apparatus 600 may also comprise other functions and structures.

The apparatus 600 for improving the efficiency of a DAS comprises a processor 602. The processor 602 may be implemented with a separate digital signal processor provided with suitable software embedded on a computer readable medium, or with a separate logic circuit, such as an application specific integrated circuit (ASIC). The processor 602 may comprise an interface such as computer port for providing communication capabilities.

According to an embodiment, the processor 602 is used to obtain knowledge of user allocation options and determine quality information for the user allocation options or for each user terminal that is served by the apparatus 600.

The apparatus 600 may comprise a memory 604 connected to the processor 602. The processor 602 may store information related to the user allocation options in the memory 604. The memory 604 may further comprise information related to the coefficients for performing beamforming, quality information, or the like. However, memory may also be integrated to the processor 602 and, thus, the memory 604 may not be required.

Further, the processor 602 participates in determining the optimal user allocation and applying beamforming according to the optimal user allocation.

The apparatus 600 may further comprise a transceiver (TRX) 606. The TRX 606 may further be connected to one or more antennas 608A to 608M enabling connection to and from an air interface. Alternatively, the one or more antennas 608A to 608M may be connected to a wired interface. The TRX 606 enables transmission and/or reception of information. The one or more antennas 608A to 608M may be used in generating beams or nulls in desired directions. The precoding coefficients (weights) may be determined by the processor 602 and applied to the one or more antenna elements 608A to 608M such that suitable beamforming is obtained.

According to an embodiment, the apparatus 600 is in a base station of a mobile communication network. The base station may be acting as a master base station or as a slave base station according to an embodiment.

When the apparatus 600 is in a base station acting as a master base station according to an embodiment, the processor 602 is responsible of at least one of the following: determining the user allocation options, communicating the user allocation options to other base stations of the DAS, determining quality information, receiving quality information from other base stations of the DAS, combining the quality information, determining the optimal user allocation, communicating the optimal user allocation to other base stations of the DAS, and applying beamforming according to the optimal user allocation. The processor 602 may naturally use the memory 604 and the TRX 606 together with the one or more antennas 608A to 608M in performing the functions.

Further, when the apparatus 600 is in a base station acting as a slave base station according to an embodiment, the processor 602 is responsible of at least one of the following:

receiving information related to user allocation options, determining quality information, communicating quality information to a master base station, thus participating in determining the optimal user allocation, receiving the optimal user allocation from the master base station, and applying beamforming on the basis of the optimal user allocation. The processor 602 may naturally use the memory 604 and the TRX 606 together with one or more antennas 608A to 608M in performing the functions.

Figure 7:
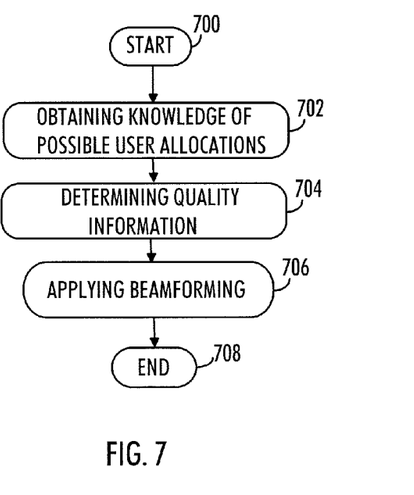
FIG. 7 illustrates a method for improving efficiency in a distributed antenna system according to an embodiment.

FIG. 7 shows a method for improving the reliability and performance of a DAS. The method begins in step 700. In step 702, the method obtains knowledge of user allocation options. This may happen either by determining the user allocation or by receiving information related to it. In step 704, the quality information is determined. The quality information may be related to each user allocation option, or to each communication link between each user that is marked as served from the corresponding apparatus performing this part of the method. Finally, step 706 comprises applying beamforming according to the optimal user allocation. The beamforming may be zero-forcing beamforming, or some other type of less restrictive beamforming method with regard to null steering. The method ends in step 708.

Figure 8:
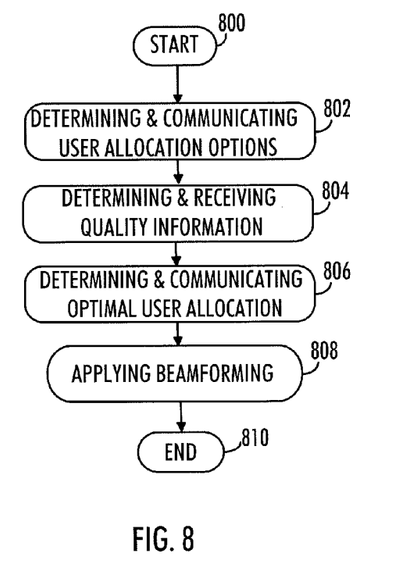
FIG. 8 presents a method for improving the efficiency in the distributed antenna system from the viewpoint of a master base station according to an embodiment.

FIG. 8 shows a method for improving the reliability and performance of a DAS from the viewpoint of a master base station according to an embodiment. The method starts in step 800. In step 802, the method determines the user allocation options and communicates the user allocation options to other base stations of the DAS. Step 804 comprises determining quality information related to the master base station and receiving quality information from the other base stations of the DAS. In step 806, the optimal user allocation is determined. Further, the master base station may combine the available quality information in order to determine the optimal user allocation. The master base station may in this step also communicate the optimal user allocation to the other base stations of the DAS. In step 808, the master base station may apply beamforming according to the optimal user allocation. The method ends in step 810.

Figure 9:
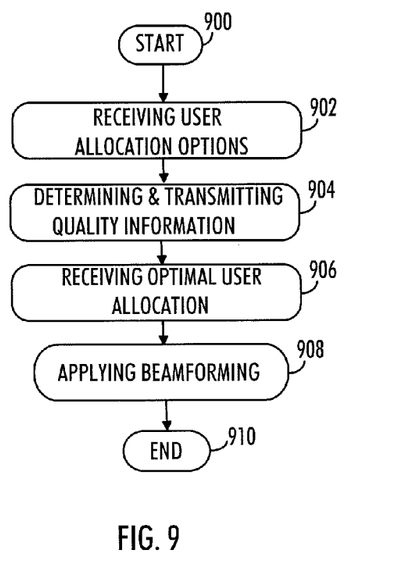
FIG. 9 presents a method for improving the efficiency in the distributed antenna system from the viewpoint of a slave base station according to an embodiment.

FIG. 9 shows a method for improving the reliability and performance of a DAS from the viewpoint of a slave base station according to an embodiment. The method starts in step 900. In step 902 the method receives information related to user allocation options from the master base station. In step 904, quality information is determined and communicated to the master base station. This way, both the master base station and the slave base station participate in determining the optimal user allocation. Step 906 comprises receiving the optimal user allocation from the master base station. In step 908, the slave base station may start applying beamforming on the basis of the optimal user allocation. The method ends in step 910.

The embodiments of the invention offer many advantages. Communicating only very little information instead of the CSI enables the communication network to apply backhaul resources to other purposes. The little information that is communicated according to an embodiment comprises, for example, the indexes of the user allocation options, the quality information and the index of the optimal user allocation. Each of theses parameters may be represented in real values. Further, the values may be scalar. Thus, the communication of such information requires significantly less resources and feedback than the communication of the CSI, or the like.

Further, according to an embodiment, each stream is transmitted from a single NB, thus no coherent transmission between the NBs is needed. Further, large performance gains may be obtained due to the fast beam/null (re)allocation solution according to the embodiment. That is, according to an embodiment, the optimal user allocation and applying of beamforming accordingly may be performed again during on-going communication of the DAS, if seen appropriate.

Figure 10:
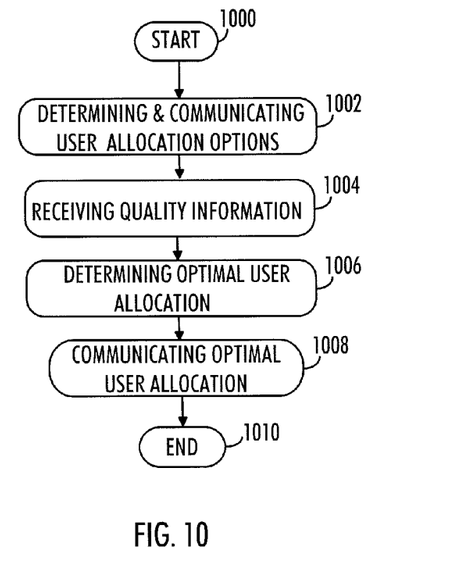
FIG. 10 presents a method for improving the efficiency in the distributed antenna system according to an embodiment.

Although the embodiments of the invention have been described such that one base station of the DAS is acting as a master BS and, therefore, controlling the other base stations, the control of the base stations of the DAS could be performed by a separate controller without departing from the scope of the invention. FIG. 10 shows a method in which a controller is responsible for determining the optimal user allocation according to an embodiment. The method begins in step 1000. In step 1002, determining at least one user allocation option for a distributed antenna system comprising at least two base stations takes place. The controller may have had prior communication to the at least two base station of the DAS in order to do this. In the communication, the controller may have obtained knowledge of the locations of the user terminals in relation to the locations of the at least two base stations. Further in step 1002, the controller communicates the at least one user allocation option to at least one base station. In step 1004, the controller receives quality information related to the at least one user allocation option from the at least one base station, the quality information being represented in at least one real value. Further the quality information is, according to an embodiment, a scalar value for each user allocation option. In step 1006, the controller determines the optimal user allocation for the at least one base station on the basis of the received quality information. In step 1008, the controller communicates the optimal user allocation to the at least one base station. The method ends in step 1010.

According to an embodiment, an apparatus, such as the controller, able to perform the method of FIG. 10 may have similar structure as shown in FIG. 6, wherein the transceiver 606 is considered to represent an interface for communication. However, according to an embodiment, the apparatus does not have the antenna elements 608A to 608M.

The techniques and methods described herein may be implemented by various means. For example, these techniques may be implemented using hardware (one or more devices), firmware (one or more devices), software (one or more modules), or combinations thereof. For a hardware implementation, the apparatus of FIG. 6 may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions) that perform the functions described herein. The software codes may be stored in a memory unit and executed by processors. The memory unit may be implemented within the processor or externally to the processor. In the latter case, the memory can be communicatively coupled to the processor via various means as is known in the art. Additionally, the components of the systems described herein may be rearranged and/or complimented by additional components in order to facilitate the achieving of the various aspects, described with regard thereto, and they are not limited to the precise configurations set forth in the given figures, as will be appreciated by one skilled in the art.

Thus, according to an embodiment, the apparatus for performing the tasks of FIGS. 3 and 7 to 9 comprises processing means for obtaining to a base station of a distributed antenna system comprising at least two base stations knowledge of at least one user allocation option regarding the base station, processing means for determining quality information related to at least one user allocation option regarding the base station, the quality information being represented in at least one real value, processing means for participating in determining an optimal user allocation on the basis of the quality information, and processing means for applying beamforming towards a selected, base station specific set of user terminals on the basis of the optimal user allocation.

Further, according to an embodiment, the apparatus for performing the tasks of FIG. 10 comprises processing means for determining at least one user allocation option for a distributed antenna system comprising at least two base stations, means for communicating the at least one user allocation option to at least one base station, means for receiving quality information related to the at least one user allocation option from the at least one base station, the quality information being represented in at least one real value, processing means for determining optimal user allocation for the at least one base station on the basis of the received quality information; and means for communicating the optimal user allocation to the at least one base station.

Embodiments of the invention may be implemented as computer programs in the apparatus according to the embodiments of the invention. The computer programs comprise instructions for executing a computer process for improving the reliability of the DAS. The computer programs implemented in the apparatus may carry out, but is not limited to, the tasks related to FIGS. 3 and 7 to 10.

The computer programs may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method, comprising:
   determining, in a base station of a distributed antenna system comprising at least two base stations, the user allocation options comprising the possible serving base stations for each user terminal within the distributed antenna system;
   determining quality information related to at least one of the following: the user allocation options comprising the user terminals that are possibly served by each base station, and a communication link for each user terminal that is possibly served by a base station, wherein the quality information comprises either a combined rate for each user allocation option regarding the base station or a channel gain for each communication link between the base station and the user terminals that are possibly served by the base station, wherein the combined rate corresponds to all of the communication links between the base station and the user terminals in one user allocation option;
   communicating to each base station of the distributed antenna system at least one user allocation option comprising information representing at least one user terminal that is possibly served by the corresponding base station and
   applying beamforming towards a selected, base station-specific set of user terminals on the basis of an optimal user allocation, the optimal user allocation being determined according to the available quality information.

2. The method of claim 1, further comprising: generating nulls or a controlled amount of interference towards the users not belonging to the selected, base station-specific set of user terminals.

3. The method of claim 1, further comprising:
   receiving, at a base station, at least one user allocation option;
   determining quality information related to at least one of the following: each possible user allocation option related to the base station, and a communication link for each user terminal that is possibly served by the base station; and
   communicating the quality information back to the transmitter of the at least one user allocation option.

4. The method of claim 1, further comprising:
   determining, in a base station for each user allocation option regarding the base station, coefficients for applying beamforming.

5. The method of claim 1, further comprising:
   receiving, at a base station, the quality information from the base stations of the distributed antenna system;
   combining the plurality of available quality information;
   determining the optimal user allocation for each base station of the distributed antenna system on the basis of the combined quality information; and
   communicating to each base station of the distributed antenna system the optimal user allocation regarding the corresponding base station.

6. The method of claim 5, further comprising:
   determining the optimal user allocation such that it results in the maximum sum rate across the distributed antenna system.

7. A non-transitory computer program product embodied on a distribution medium readable by a computer and comprising program instructions which, when loaded into an apparatus, executes the method according to claim 1.

8. An apparatus, comprising:
   a processor configured to:
   obtain knowledge of at least one user allocation option regarding the apparatus in a distributed antenna system comprising at least two base stations, wherein a user allocation option comprises information representing at least one user terminal that is possibly served by the apparatus;
   determine quality information related to the at least one user allocation option regarding the apparatus, the quality information being represented in at least one real value; and
   apply beamforming towards a selected, base station-specific set of user terminals on the basis of an optimal user allocation, the optimal user allocation being determined according to the available quality information;
   wherein the processor is further configured to:

determine the user allocation options comprising possible serving base stations for each user terminal within the distributed antenna system;

determine the quality information related to at least one of the following: each possible user allocation option related to the possible serving base stations, and a communication link for each user terminal that is possibly served by a base station; and communicate to each base station of the distributed antenna system at least one user allocation option comprising information representing at least one user terminal that is possibly served by the corresponding base station;

wherein the quality information comprises either a combined rate for each user allocation option regarding the apparatus or a channel gain for each communication link between the apparatus and the user terminals that are possibly served by apparatus, wherein the combined rate corresponds to all of the communication links between the apparatus and the user terminals in one user allocation option.

9. The apparatus of claim 8, wherein the processor is further configured to:

generate nulls or a controlled amount of interference towards the users not belonging to the selected, base station-specific set of user terminals.

10. The apparatus of claim 8, further comprising an interface configured to:

receive at least one user allocation option; and the processor is further configured to:

determine the quality information related to at least one of the following: each possible user allocation option related to the apparatus, and a communication link for each user terminal that is possibly served by the apparatus; and the interface is further configured to:

communicate the quality information back to the transmitter of the at least one user allocation option.

11. The apparatus of claim 8, wherein the processor is further configured to:

determine, for each user allocation option regarding the apparatus, coefficients for applying beamforming.

12. The apparatus of claim 8, further comprising an interface configured to:

receive the quality information from the base stations of the distributed antenna system; and the processor is further configured to:

combine the plurality of available quality information; and to determine the optimal user allocation for each base station of the distributed antenna system on the basis of the combined quality information; and the interface is further configured to:

communicate to each base station of the distributed antenna system the optimal user allocation regarding the corresponding base station.

13. The apparatus of claim 12, wherein the interface is further configured to:

determine the optimal user allocation such that it results in the maximum sum rate across the distributed antenna system.

14. An apparatus comprising:

processing means for obtaining, at a base station of a distributed antenna system comprising at least two base stations, knowledge of at least one user allocation option regarding the base station, wherein a user allocation option comprises information representing at least one user terminal that is possibly served by the apparatus;

processing means for determining quality information related to the at least one user allocation option regarding the base station, the quality information being represented in at least one real value; and processing means for applying beamforming towards a selected, base station-specific set of user terminals on the basis of an optimal user allocation, the optimal user allocation being determined according to the available quality information;

further comprising:

determining, in a base station, the user allocation options comprising possible serving base stations for each user terminal within the distributed antenna system;

determining quality information related to at least one of the following: each possible user allocation option related to the possible serving base stations, and a communication link for each user terminal that is possibly served by a base station; and communicating to each base station of the distributed antenna system at least one user allocation option comprising information representing at least one user terminal that is possibly served by the correspond ling base station;

wherein the quality information comprises either a combined rate for each user allocation option regarding the base station or a channel gain for each communication link between the base station and the user terminals that are possibly served by the base station, wherein the combined rate corresponds to all of the communication links between the base station and the user terminals in one user allocation option.

15. A method, comprising:

determining at least one user allocation option for a distributed antenna system comprising at least two base stations, wherein a user allocation option comprises information representing at least one user terminal that is possibly served by a base station;

communicating the at least one user allocation option to at least one base station;

receiving quality information related to the at least one user allocation option from the at least one base station, the quality information being represented in at least one real value; and determining an optimal user allocation for the at least one base station on the basis of the received quality information; and communicating the optimal user allocation to the at least one base station;

further comprising:

determining, in a base station, the user allocation options comprising possible serving base stations for each user terminal within the distributed antenna system;

determining quality information related to at least one of the following: each possible user allocation option related to the possible serving base stations, and a communication link for each user terminal that is possibly served by a base station; and communicating to each base station of the distributed antenna system at least one user allocation option comprising information representing at least one user terminal that is possibly served by the corresponding base station;

wherein the quality information comprises either a combined rate for each user allocation option regarding the base station or a channel gain for each communication link between the base station and the user terminals that are possibly served by the base station, wherein the combined rate corresponds to all of the communication links between the base station and the user terminals in one user allocation option.

16. The method of claim 15, wherein the quality information comprises either a combined rate for each user allocation option or a channel gain for each communication link between a base station and user terminals that are possibly served by the base station, wherein the combined rate corresponds to all of the communication links between the base station and user terminals in one user allocation option.

17. The method of claim 15, further comprising:
determining the optimal user allocation such that it results in the maximum sum rate across the distributed antenna system.

18. A non-transitory computer program product embodied on a distribution medium readable by a computer and comprising program instructions which, when loaded into an apparatus, executes the method according to claim 15.

19. An apparatus, comprising a processor configured to:
determine at least one user allocation option for a distributed antenna system comprising at least two base stations, wherein a user allocation option comprises information representing at least one user terminal that is possibly served by a base station; the apparatus further comprising an interface configured to:
communicate the at least one user allocation option to at least one base station; receive quality information related to the at least one user allocation option from the at least one base station, the quality information being represented in at least one real value; and the processor being further configured to:
determine an optimal user allocation for the at least one base station on the basis of the received quality information; and the interface being further configured to:
communicate the optimal user allocation to the at least one base station;
the interface further configured to:
determine, in a base station, the user allocation options comprising possible serving base stations for each user terminal within the distributed antenna system;
determine quality information related to at least one of the following: each possible user allocation option related to the possible serving base stations, and a communication link for each user terminal that is possibly served by a base station; and
communicate to each base station of the distributed antenna system at least one user allocation option comprising information representing at least one user terminal that is possibly served by the corresponding base station;
wherein the quality information comprises either a combined rate for each user allocation option regarding the base station or a channel gain for each communication link between the base station and the user terminals that are possibly served by the base station, wherein the combined rate corresponds to all of the communication links between the base station and the user terminals in one user allocation option.

20. The apparatus of claim 19, wherein the quality information comprises either a combined rate for each user allocation option or a channel gain for each communication link between a base station and user terminals that are possibly served by the base station, wherein the combined rate corresponds to all of the communication links between the base station and user terminals in one user allocation option.

21. The apparatus of claim 19, wherein the processor is further configured to:
determine the optimal user allocation such that it results in the maximum sum rate across the distributed antenna system.

22. An apparatus, comprising:
processing means for determining at least one user allocation option for a distributed antenna system comprising at least two base stations, wherein a user allocation option comprises information representing at least one user terminal that is possibly served by a base station;
communication means for communicating the at least one user allocation option to at least one base station;
receiving means for receiving quality information related to the at least one user allocation option from the at least one base station, the quality information being represented in at least one real value; and
processing means for determining an optimal user allocation for the at least one base station on the basis of the received quality information;
the communication means further comprising means for communicating the optimal user allocation to the at least one base station;
the processing means further comprising means for determining, in a base station, the user allocation options comprising possible serving base stations for each user terminal within the distributed antenna system;
the processing means further comprising means for determining quality information related to at least one of the following: each possible user allocation option related to the possible serving base stations, and a communication link for each user terminal that is possibly served by a base station; and
the communication means further comprising means for communicating to each base station of the distributed antenna system at least one user allocation option comprising information representing at least one user terminal that is possibly served by the corresponding base station;
wherein the quality information comprises either a combined rate for each user allocation option regarding the base station or a channel gain for each communication link between the base station and the user terminals that are possibly served by the base station, wherein the combined rate corresponds to all of the communication links between the base station and the user terminals in one user allocation option.

* * * * *

UNITED STATES PATENT AND TRADEMARK OFFICE
CERTIFICATE OF CORRECTION

PATENT NO. : 8,620,340 B2
APPLICATION NO. : 13/257160
DATED : December 31, 2013
INVENTOR(S) : Antti Tölli et al.

It is certified that error appears in the above-identified patent and that said Letters Patent is hereby corrected as shown below:

In the Claims:

In Claim 14:
Column 14, line 22, "correspond ling" should be deleted and --corresponding-- should be inserted.

Signed and Sealed this
Fifteenth Day of April, 2014

Michelle K. Lee
*Deputy Director of the United States Patent and Trademark Office*